Nov. 1, 1966         L. W. McCORKINDALE ETAL         3,282,086
                ULTRASONIC PULSE TESTING APPARATUS
Filed Aug. 29, 1963                              2 Sheets-Sheet 1

INVENTORS
Lawrence W. McCorkindale
James F. McNulty
BY Wooster, Davis & Cifelli
ATTORNEYS.

INVENTORS
Lawrence W. McCorkindale
James F. McNulty
BY
Wooster, Davis & Cifelli
ATTORNEYS.

United States Patent Office 3,282,086
Patented Nov. 1, 1966

3,282,086
ULTRASONIC PULSE TESTING APPARATUS
Lawrence W. McCorkindale, Bethany, Conn., and James F. McNulty, Westbury, N.Y., assignors to Automation Industries, Inc., El Segundo, Calif., a corporation of California
Filed Aug. 29, 1963, Ser. No. 306,409
11 Claims. (Cl. 73—67.8)

This invention relates to ultrasonic testing and, more particularly, to an ultrasonic thickness measuring apparatus and a pulse generator for use with the same. In ultrasonic testing equipment, a short-duration, high-amplitude pulse of ultrasonic frequency is applied to a transducer, such as a piezoelectric crystal, which is suitably coupled to the surface of the object being tested. The pulse is simultaneously applied to suitable time-measuring equipment in the apparatus itself. The transducer converts the electrical energy into mechanical vibrations which travel through the test object until they reach the opposite side or some other interface at which they are reflected. The speed of mechanical vibration through the object is a function of the material of which the object is made. Accordingly, a measurement of the time interval required for the mechanical vibration to pass through the test object and for the echo pulse to return from the opposite side provides a measurement of the thickness of the object under test or of the depth of an internal defect. For maximum effectiveness and accuracy of measurement, the pulse which is applied to the transducer should be of extremely short duration and also of high amplitude. This has posed some difficulties in the design of pulser circuits for use with such equipment.

The bistable, two-terminal semiconductive device, also known as a Shockley four-layer diode, has been proposed for use in a number of pulser circuits. These devices are diodes of the PNPN type and are two-terminal devices. Such a diode operates in either of two states: an "open" or high impedance state, and a "closed" or low impedance state. The device is switched from one state to the other by means of the voltage and current which are applied to it. As the voltage is raised in a forward direction, the diode reaches a breakdown voltage and changes to the low impedance condition. This "closes" the circuit between its two terminals. The circuit through the diode then remains closed so long as the required sustaining current is maintained. If the current falls below this value, however, the device returns to its high impedance state. Diodes of this type are quite satisfactory for pulser use except when the requirement is for a very short pulse of large amplitude such as needed in ultrasonic thickness measurement. A "short" pulse may be defined as one having a duration not greatly exceeding the switching time of the device and one in which the pulse rise time is less than the switching time.

It is, accordingly, a primary object of this invention to provide an improved ultrasonic testing device. Another object is to provide such a device including a pulser capable of producing high amplitude pulses of extremely short duration. Other objects are to provide such a pulser having a variable frequency and to provide such a pulser which is particularly adaptable for use with Shockley diodes.

The manner in which the above objects are achieved will be more apparent from the following description, the appended claims, and the figures of the attached drawing, wherein:

Figure 1:
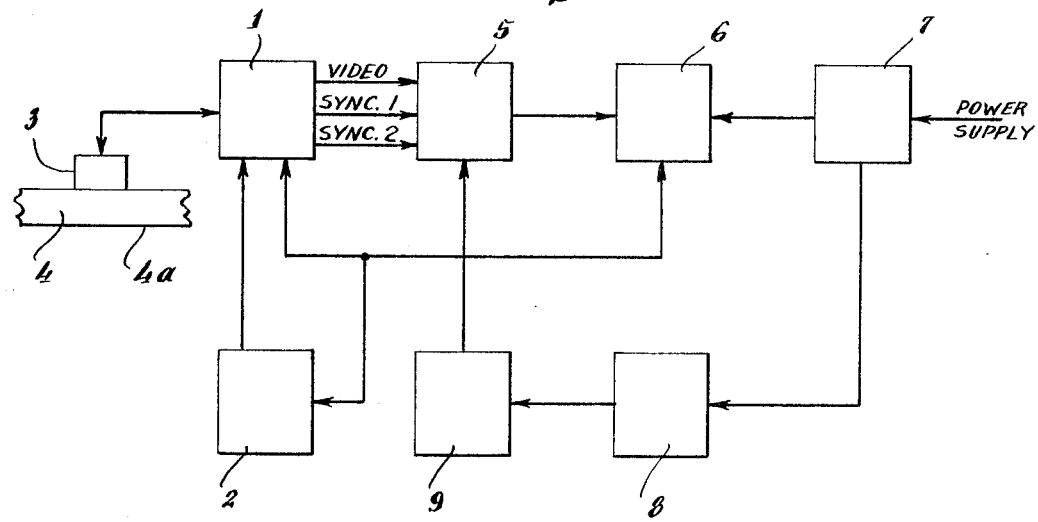
FIG. 1 is a block diagram of an ultrasonic thickness measuring apparatus employing the improved pulser circuit described herein.

In FIG. 1 there is illustrated a pulser/receiver circuit 1 which is under the control of a sync oscillator 2. The sync oscillator circuit sets the repetition rate of the pulses which, in one embodiment, is approximately 830 cycles per second. These pulses are applied to a suitable search unit 3 which may be, for example, of lithium sulfate, which converts the electrical impulse to mechanical impulses which are coupled to the test specimen 4. The mechanical impulse travels through the test specimen 4 to its back face 4a where it is echoed back to the search unit 3. Search unit 3 converts the impulse back to an electrical echo pulse. The echo pulse is applied to the input of the pulser/receiver circuit 1 where it is amplified, detected, and then passed to the meter drive circuit 5 as a video pulse. Included in meter drive circuit 5 are a gated video amplifier, flip-flop, and meter drive circuit. The pulser/receiver 1 also generates two synchronizing signals which are sent to the meter drive circuit 5. Synchronizing signal 1 activates the timing flip-flop and synchronizing signal 2 gates the video amplifier. Meter drive circuit 5 receives the video and synchronizing signals from the pulser/receiver and produces a meter drive signal which is sent to the integrating and meter circuits 6. The integrating and meter indicating circuits 6 receive the meter drive signal and produce a D.C. signal having an average level which is a function of the width of the drive signal. This average D.C. level is indicated on a meter which is calibrated in terms of distance or depth. The range selector switch 7 is utilized for selecting various resistive combinations and placing them in the D.C. averaging circuit to control the full scale or high range point on the meter. The regulator circuit 8 provides the regulated D.C. voltage supply to compensate for variations in the power supply voltage. The voltages from the regulator circuit 8 are applied to the voltage converter and filter circuits 9 which provide filtered operating voltages for use by the pulser element and the transistorized circuitry.

Figure 2:
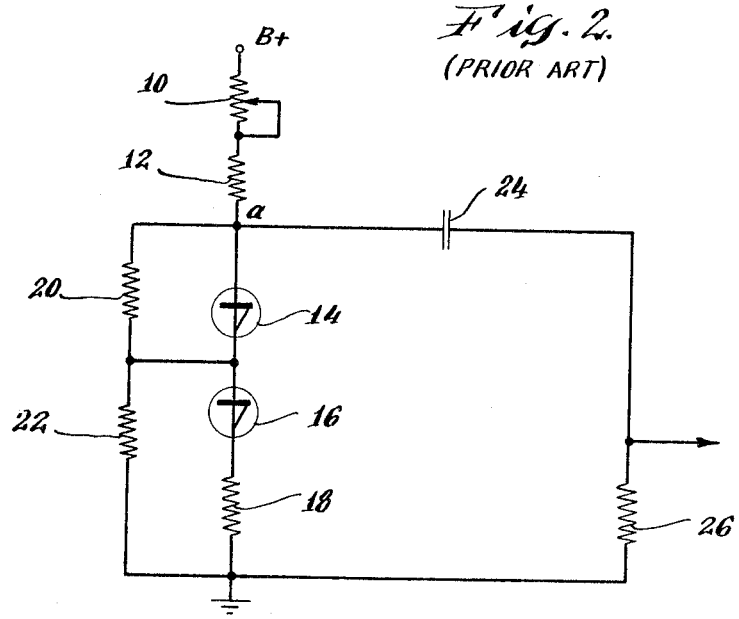
FIG. 2 is a circuit diagram illustrating a pulser in accordance with the prior art.

In order to more readily understand the operation of this invention, there is illustrated in FIG. 2 a pulser circuit in accordance with the prior art. The circuit includes a potentiometer 10 and a fixed resistor 12 connected in series between Shockley diodes 14, 16 and a source of positive voltage B+. In addition, a current limiting resistor 18 is connected in series with the Shockley diodes and ground. The fixed resistor 12 determines the maximum current which may be drawn by the Shockley diodes and the output pulse frequency may be varied by changing the setting of potentiometer 10. A relatively high impedance resistor 20 is connected across diode 14 and a similar resistor 22 is connected across diode 16. A timing capacitor 24 and a load resistor 26 are connected in series across the Shockley diodes, the pulse output being taken from between them, as illustrated.

The circuit of FIG. 2 operates as follows: With the Shockley diodes 14, 16 in the nonconductive states, the voltage across capacitor 24 begins to build as the capacitor charges, and charging current flows through the resistor 26 causing the voltage across resistor 26 at the output to rise exponentially. The voltage at point *a* also rises exponentially at a rate determined by the size of the capacitor 24 and the value of potentiometer 10 and resistor 12. Resistors 20 and 22 are of essentially the same value and, therefore, tend to divide the voltage at point *a* across them so that one-half the voltage is across each of the Shockley diodes. When either of the Shockley diodes 14, 16 reaches its firing voltage, it begins to break down. This rapidly increases the voltage across the other diode so that it, too, begins to break down. With the Shockley diodes 14, 16 in the conductive state, a lower impedance path is provided for the discharge of the capacitor 24. As capacitor 24 discharges, the voltage between the output and ground across load resistor 26 also decreases. However, it is to be noted that the discharge of the capacitor 24 takes place exponentially and thus lengthens the pulse duration time. Accordingly, in order to get a shorter pulse from the circuit of FIG. 2, it is necessary to make the timing capacitor 24 very small so that it is completely discharged in the required pulse duration time. However, this results in a dissipation of much of its stored energy in the Shockley diodes during their breakdown time and the output pulse amplitude is greatly reduced. The amplitude of the output pulse from the circuit of FIG. 2 cannot be increased by increasing the size of the capacitor 24 without broadening the pulse at the same time.

Figure 3:
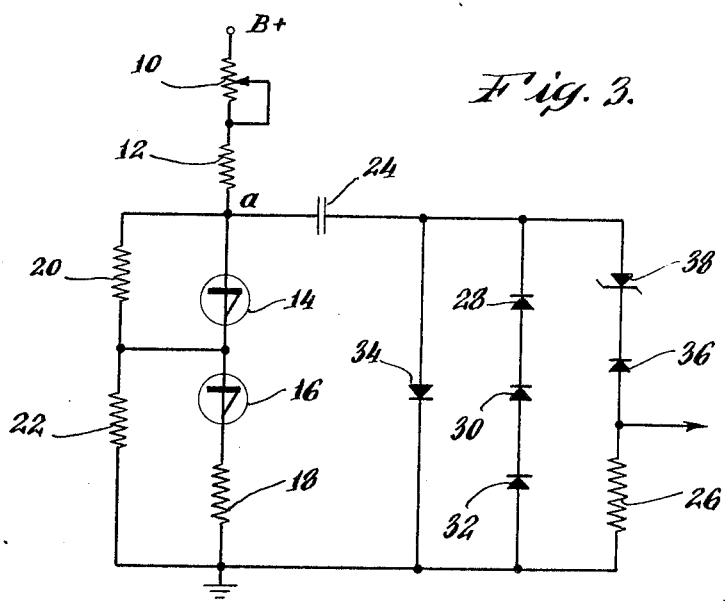
FIG. 3 is a circuit diagram illustrating a pulser in accordance with this invention.

The above mentioned deficiencies in the circuit of FIG. 2 have now been overcome by the circuit of FIG. 3. It will be noted that many of the elements of FIG. 3 are identical to those of FIG. 2 and have been given similar reference numerals. The improved operation of the circuit of the invention is achieved by first selecting a capacitor 24 suitable for achieving the desired pulse amplitude. At the instant the desired amplitude is reached, a separate path is introduced into the circuit through which the capacitor 24 can continue to discharge without the discharge current passing through the load resistor 26. This achievement is accomplished by means of diodes 28, 30, 32 which are connected in series across the load resistor 26, and are polarized to conduct discharge current from the capacitor 24. The diode 34 is connected in parallel with the diodes 28, 30 and 32 but in a reversed polarity. Between the capacitor 24 and the output there is also provided a diode 36 which is connected with the same polarity as the diodes 28, 30, 32 but is in series with a Zener diode 38 connected in a reversed polarity.

The operation of the circuit of FIG. 3 is as follows: At the beginning of operation, the Shockley diodes 14, 16 are in the nonconductive state, and the resistance of resistors 20, 22 is relatively large. Accordingly, a charging current flows through capacitor 24 and diode 34 to ground. The voltage at point *a* then rises exponentially at a rate determined by the value of the capacitor 24, the potentiometer 10, and resistor 12. The firing voltage across the Shockley diodes builds up in the same fashion as in the circuit of FIG. 2 until the Shockley diodes fire and provide a discharge path for the capacitor 24.

Diodes 28, 30, 32 are of a type which are capable of high surge currents and have relatively slow switching times. Accordingly, they do not immediately establish a circuit for the flow of discharge current. The voltage of the charge capacitor 24 is therefore applied directly across the combination of load resistor 26, diode 36, and fast-switching Zene diode 38. The Zener diode 38 immediately breaks down and allows the flow of discharge current and a consequent pulse of output voltage to appear on the positive side of load resistor 26. Were it not for the provision of diodes 28, 30, 32, the output pulse would then decay exponentially along with the discharge of capacitor 24. However, these diodes now break down in the forward direction and thus provide a short circuit of the discharge current around the load resistor 26 and cause the output voltage to drop very rapidly to an extremely low value. For example, with the circuit of this invention, a 300 volt pulse having a duration of 1/10 microsecond has been achieved.

As the capacitor 24 discharges, a current which is determined chiefly by the current-limiting resistor 18 is flowing and causing a voltage drop to appear across the three series diodes. The effects of this voltage drop are prevented from reaching the output by the diode 36. After a few microseconds, the capacitor 24 is discharged sufficiently to allow the Shockley diodes 14, 16 to revert to their non-conducting state. The capacitor then begins to charge once more and the cycle repeats.

In the FIG. 3 embodiment of this invention, a pair of series connected Shockley diodes 14, 16 are employed in one arm and three series connected diodes 28, 30, 32 are in another. However, it will be understood that, in each instance, single units may be employed if available in the proper ratings.

Figure 4:
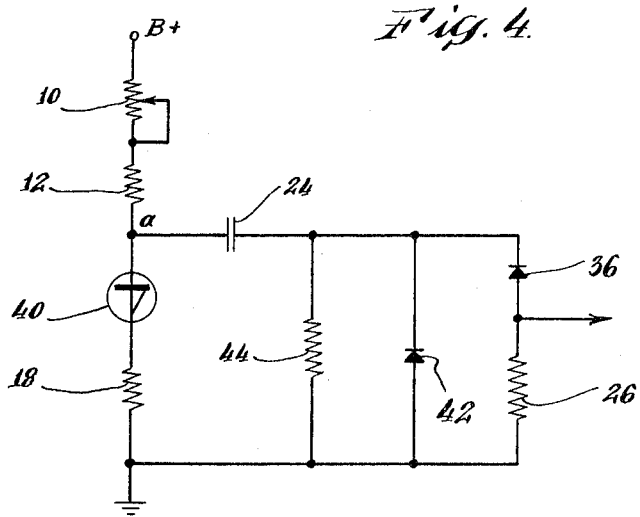
FIG. 4 is a circuit diagram illustrating a modification of the pulser illustrated in FIG. 3.

An example of a modification of this invention is illustrated in FIG. 4. In this circuit the dual Shockley diodes 14, 16 of FIG. 3 are replaced by the single Shockley diode 40. The series connected diodes 28, 30, 32 are replaced by the single slow switching diode 42 and the charging diode 34 is replaced by a resistor 44. The Zener diode 38 of FIG. 3 is omitted. Other components are given reference numerals corresponding to similar elements of FIG. 3. In one embodiment of a thickness gauge employing the pulser of FIG. 4 the applied voltage B+ has a value of 300 volts. The breakdown value of the Shockley diode 40 is approximately 200 volts. When this value is reached, it immediately goes into conduction, presenting virtually a short circuit across its terminals. The capacitor 24 can no longer hold its acquired charge and thereupon discharges through the path provided by diode 36 and resistor 26. Because of time delay, diode 42 does not conduct instantly. It will start conducting when the voltage across it reaches approximately 100 volts. At this time the output pulse is shunted through a rapid decay discharge path to ground. When the discharge current of the capacitor 24 drops below the holding point of Shockley diode 40, it shuts off. Capacitor 24 once again charges toward the breakdown potential of the Shockley diode and the cycle is repeated. Thus, a negative-going pulse with a sharp leading edge, an exponentially curved trailing edge, and an amplitude close to the breakdown voltage of the Shockley diode 40 is produced across diode 42. This pulse is coupled through the diode 36 and resistor 26 network to the search unit.

Although the foregoing has been limited to the description of circuits utilizing the Shockley four-layer diode as the switching device, the invention is not, in fact, so limited. Any suitable switching device, such as a thyratron, for example, may be used in place of the Shockley diode. Furthermore, although the invention is described as employing certain other named components, such as Zener diodes, the invention is not to be construed as limited thereto. Elements having similar characteristics may be substituted therefor. Other variations and modifications will also be apparent to those skilled in the art. Accordingly, the foregoing description is to be construed as illustrative rather than limiting. This invention is limited only by the scope of the following claims.

What we claim as new and desire to secure by Letters Patent of the United States is:

1. In ultrasonic testing apparatus including a pulser circuit for producing electrical driving pulses, an electromechanical transducer connected to receive said driving pulses and transmit ultrasonic vibrations corresponding thereto into a test object, means for receiving echo pulses from said object, and indicating means responsive to said pulses, the improvement wherein said pulser circuit comprises: capacitor means; charging circuit means connecting said capacitor means in charging relationship with a source of charging potential; bypass means connected to provide a discharge path from said capacitor means having a substantially open circuit first state and a substantially closed circuit second state, said bypass means being changeable from said first to said second state upon establishment of a preselected potential across said capacitor means to provide said discharge path; load impedance means connected in series with said capacitor means and said source of charging potential; relatively slow switching diode means connected in parallel with said load impedance means to provide a discharge path from said capacitor; said driving pulses being derived from the voltage drop across said load impedance means.

2. The apparatus of claim 1 wherein said bypass means is a four-layer semiconductor switch.

3. The apparatus of claim 1 wherein said charging circuit means comprises resistor means.

4. The apparatus of claim 1 wherein said charging circuit means comprises diode means.

5. In ultrasonic testing apparatus including a pulser circuit for producing electrical driving pulses, an electromechanical transducer connected to receive said driving pulses and transmit mechanical vibration of ultrasonic frequency corresponding thereto into a test object, means for receiving echo pulses from said object, and indicating means responsive to said pulses, the improvement wherein said pulser circuit comprises capacitor means; charging circuit means including first impedance means connecting said capacitor means in charging relationship with a source of charging potential; bypass means in parallel with both of said capacitor means and first impedance means having a substantially open circuit first state and a substantially closed circuit second state, said bypass means being changeable from said first to said second state upon establishment of a preselected potential across said capacitor means to establish a discharge path therefrom; relatively slow switching first diode means connected in parallel with said first impedance means and adapted to provide a discharge path from said capacitor means; load impedance means and second diode means connected in a series combination with one another, said series combination being connected in parallel with said first diode means; and said driving pulses being derived from the voltage drop across said load impedance means.

6. The apparatus of claim 5 wherein said bypass means is a four-layer semiconductor switch.

7. A pulser circuit which comprises; capacitor means; first impedance means in series with said capacitor means; means connecting said capacitor means and first impedance means in series relationship with a source of charging potential; bypass means connected in parallel with both of said capacitor means and first impedance means having a substantially open circuit first state and a substantially closed circuit second state, said bypass means changing from said first to said second state upon establishment of a preselected charge potential across said capacitor means to provide a discharge path therefrom; load impedance means and first diode means connected in series, the series circuit being connected in parallel across said first impedance means, said first diode means being polarized to conduct capacitor discharge current; second diode means in parallel with said first impedance means and polarized to conduct capacitor discharge current; whereby a voltage pulse is produced from said load impedance means.

8. The circuit of claim 7 wherein said bypass means is a four-layer semiconductor switch.

9. A pulse circuit which comprises: capacitor means; first diode means in series with said capacitor means; means for connecting said capacitor means and first diode means in series with a source of charging potential; Shockley diode means in parallel with said capacitor means and first diode means to provide a capacitor discharge path in its closed circuit state; load resistor means, second diode means, and breakdown diode means connected in a series circuit, the series circuit being connected in parallel across said Shockley diode means, said second diode means being polarized to conduct capacitor discharge current, said breakdown diode means having a polarity normally opposed to said second diode means and a breakdown voltage less than that of said Shockley diode means; third diode means in parallel with said first diode means and polarized to conduct capacitor discharge current, the forward switching time of said third diode means being greater than the reverse breakdown time of said breakdown diode means whereby a voltage pulse is produced from said load resistor means.

10. The apparatus of claim 9 wherein said Shockley diode means comprises first and second Shockley diodes in series, each diode being in parallel with a resistor.

11. The apparatus of claim 9 wherein said means for connecting comprises a variable resistance.

References Cited by the Examiner
UNITED STATES PATENTS

| | | | |
|---|---|---|---|
| 2,398,701 | 4/1946 | Firestone | 73—67.9 |
| 3,074,028 | 1/1963 | Mammano | 331—111 |

RICHARD C. QUEISSER, *Primary Examiner.*

JOHN P. BEAUCHAMP, *Assistant Examiner.*